May 11, 1926.  
F. W. BOLD  
TIME CONTROLLED MOTOR  
Filed Nov. 10, 1923  
1,583,954  
4 Sheets-Sheet 1

Inventor:
Frederick W. Bold
by Wright, Brown, Quinby & May
Attys.

May 11, 1926.

F. W. BOLD

TIME CONTROLLED MOTOR

Filed Nov. 10, 1923     4 Sheets-Sheet 2

Inventor
Frederick W. Bold
by Wright, Brown, Quinby & May
Attys.

May 11, 1926.
F. W. BOLD
1,583,954
TIME CONTROLLED MOTOR
Filed Nov. 10, 1923
4 Sheets-Sheet 3
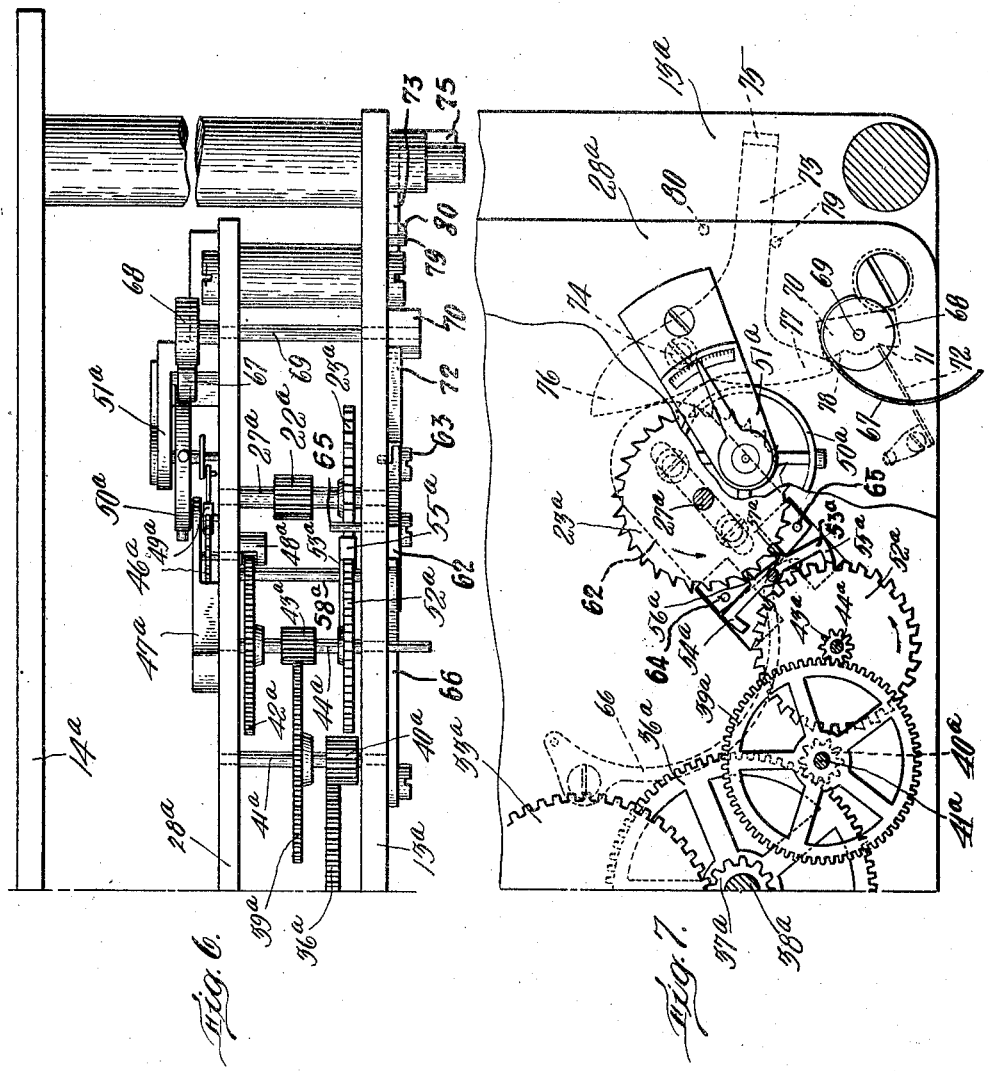
Inventor:
Frederick W. Bold
By Wright, Brown, Quinby & May
Atty.

May 11, 1926.

F. W. BOLD 1,583,954

TIME CONTROLLED MOTOR

Filed Nov. 10, 1923

Inventor:
Frederick W. Bold
By Wright, Brown, Quinby & Way
Attys.

Patented May 11, 1926.

1,583,954

UNITED STATES PATENT OFFICE.

FREDERICK W. BOLD, OF CHELSEA, MASSACHUSETTS, ASSIGNOR TO BOSTON CLOCK COMPANY, OF BOSTON, MASSACHUSETTS, A CORPORATION OF MASSACHUSETTS.

TIME-CONTROLLED MOTOR.

Application filed November 10, 1923. Serial No. 673,961.

The present invention relates to motor apparatus in which the motive power is supplied by a powerful spring and the rate of running is controlled and made uniform by a separate time mechanism, such as a spring-driven clock movement. The purpose of thus combining a spring-driven motor mechanism with a separate time train, is to obtain the driving effect of a powerful spring and at the same time to control the speed of motion imparted by such spring with an accuracy equal to that of clock movements in which accuracy in the measurement of time is the first consideration.

It is not feasible to combine in one mechanism driven by the same spring, and designed to run for considerable periods without re-winding, both an accurate time-governed speed regulating means (such as an escapement governed by a balance wheel, pendulum, or the like), and also means for delivering power in amounts which have any large ratio to the power required to drive the speed-governing movement alone in the proper way; because if a spring having a surplus of power over that required for time-keeping purposes is used, the time-keeping accuracy of the movement is impaired in greater or less degree, and there is danger of the more delicate parts of the movement being injured, as is well understood by those skilled in the clock- and watch-making arts. Hence, in conditions where large powers have to be delivered, with a uniform rate of movement over considerable periods of time, I have found it necessary to combine in the same mechanism a power motor and a separate time movement, or chronometric motor, with means by which the time movement limits and controls the rate of running of the power motor.

Among the uses to which such combined mechanisms are put are those of driving drums, tapes, dials and the like on which a continuous record of changing conditions (as pressure, temperature, rate of flow of water, etc.) is made, as well as of driving numerous other mechanical devices under conditions in which continued running at a uniform rate is required.

The particular objects of the present invention are, first, to obtain a substantially or nearly continuous motion from the power motor, and, second, to accomplish this result without either retarding or accelerating the time-keeping movement. Other objects secondary to those above-named appear in the following description.

The invention consists in the general combination accomplishing these objects, two embodiments of which are illustrated in the drawings accompanying this specification; and it further consists in the characteristics of a new let-off device as an element of the combination, and in the combination therewith escape wheels of the two motors.

Referring to the drawings,—

Figure 6 is a view similar to Figure 1 of part of a like combination embodying a different form of let-off mechanism.

Figure 7 is a rear elevation of the mechanism shown in Figure 6.

Like reference characters designate the same parts whenever they occur in all the figures.

Figures 1, 2:
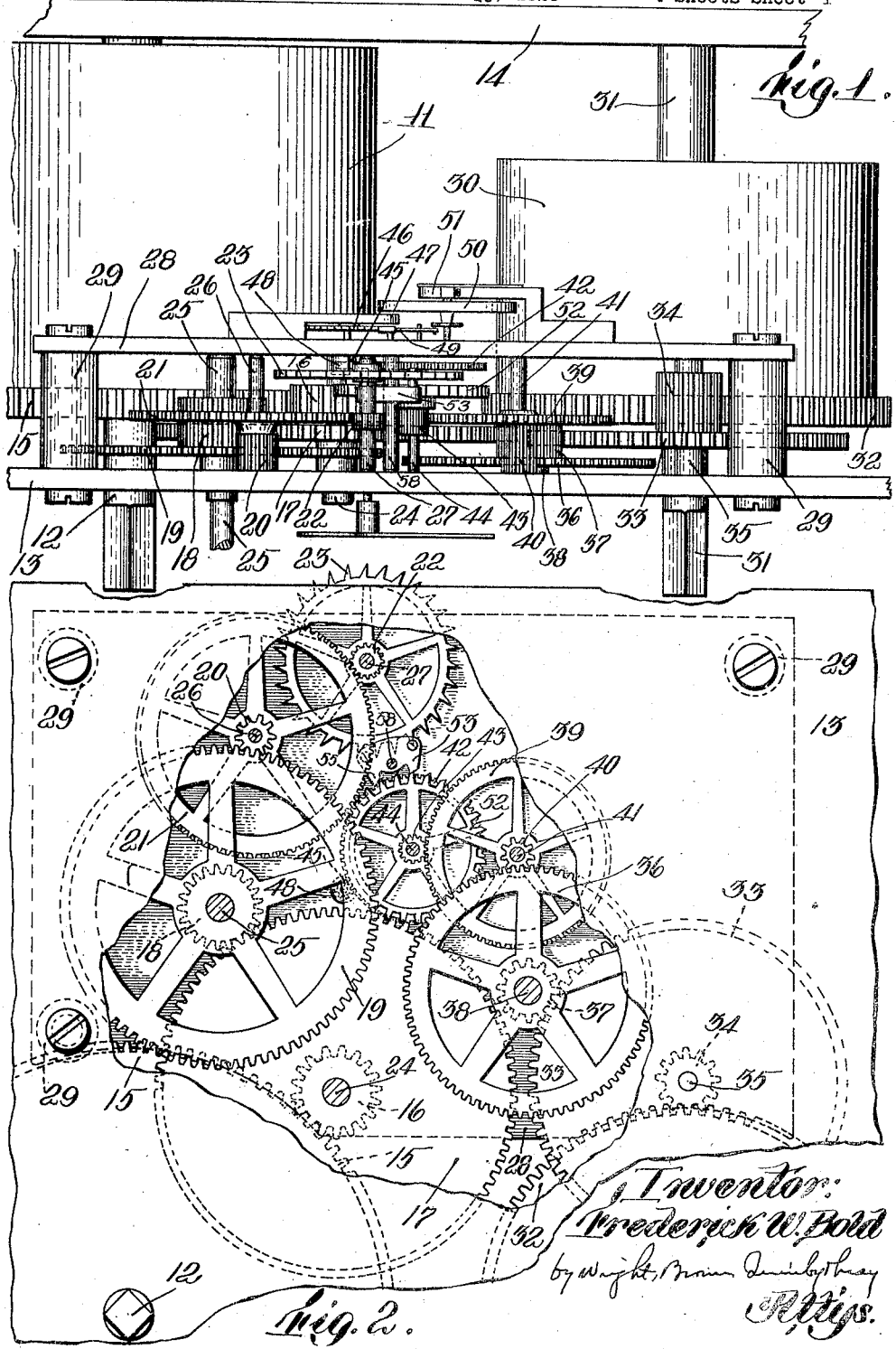
Figure 1 is a plan view of one form of combined power motor and chronometric regular embodying this invention.
Figure 2 is a front elevation of the same combination, with the front plate of the frame partly broken away to show the gear trains.

It may be assumed that the combined mechanism when set up for use is enclosed in a case and properly geared to the element or machine which it is intended to drive. Here it is shown as removed from the case and with parts of its frame broken away to reveal more clearly the operative parts.

The numeral 11 represents the barrel of what may be called for convenience in this specification the power motor of the combination. Such barrel contains a spring of sufficient length and strength for the purpose in view and is mounted to rotate upon a staff or shaft 12. This staff is supported in plates 13 and 14, and may be turned therein for winding up the spring. One end of the spring is fastened to the staff, while its other end is secured to the barrel, in a known manner. A gear 15 formed on or secured to the barrel drives the train consisting of the pinion 16, wheel 17, pinion 18, wheel 19, pinion 20, wheel 21, pinion 22 and wheel 23. The pinion 16 and wheel 17 are on the same staff 24; the pinion 18 and wheel 19 are on the same staff 25; pinion 20 and wheel 21 are on the same staff 26; and pinion 22 and wheel 23 are on the same staff 27. These staffs are mounted to rotate in the front plate 13 and the back plate 28, which plates are spaced apart and secured in a rigid frame by posts 29, in a manner well understood by those acquainted with the clock art; and the gears are meshed with one another in train, substantially as shown.

The time mechanism combination comprises a barrel 30 mounted on the winding staff or arbor 31 and containing a mainspring; a gear 32 on the barrel; combined first wheel 33 and pinion 34 on a staff 35; combined second wheel 36 and pinion 37 on a staff 38; combined third wheel 39 and pinion 40 on a staff 41; and combined fourth wheel 42 and pinion 43 on a staff 44; the staffs being mounted in suitable bearings in the plates 13, 28, and all combined to form a time train of well known character.

The fourth wheel 42 drives a pinion 45 combined with an escape wheel 46, the staff of which is mounted in a cock 47 in the rear of the plate 28 and in a potence 48 attached to the plate. This escape wheel is controlled as to its rotation by a pallet 49 and a balance wheel 50, mounted between the plate 28 and a cock 51, all combined and operating as a lever escapement of known character.

Considered as a timepiece, the time motor and train just described do not differ in any essential respect from the ordinary forms of clock in common use at the present day. This timepiece, for the purposes of the present invention, may be considered as a chronometric regulator which obstructs the running of the power motor, but permits a retarded and controlled running of the same through the agency of a let-off device in which, and in the combination thereof with other parts of the combined mechanism, together with all equivalents thereof, my present invention particularly resides.

On the same staff 44 with the fourth wheel 42 of the time train is mounted a wheel 52 which cooperates with a let-off device 53, which latter also cooperates with the wheel 23 of the train driven by the power motor. The combination of these two wheels and let-off device is shown in enlarged detail in Figures 3 and 4, to which attention is now particularly directed.

The let-off device is, in effect, a double pallet having arms 54 and 55 which coact with the teeth of wheel 52, and also having pins or studs 56 and 57 which coact with the teeth of wheel 23. This double pallet is mounted on a staff 58 which is mounted in bearings in the frame plates 13 and 28 in a similar manner to that in which the other staffs are mounted.

Figure 3:
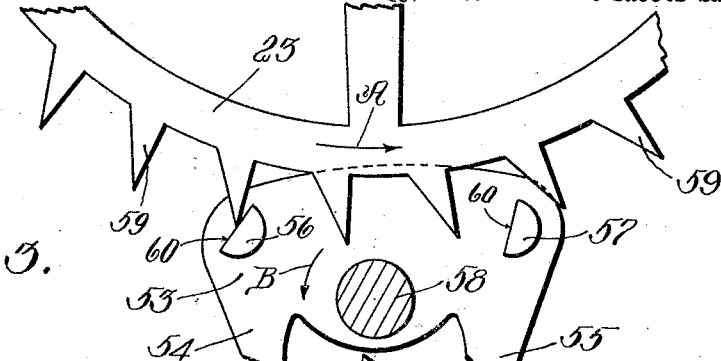
Figure 3 is a fragmentary view on an enlarged scale of the escape or let-off mechanism which is a part of this combination; represented as seen from the rear of Figure 2.
Figure 5:
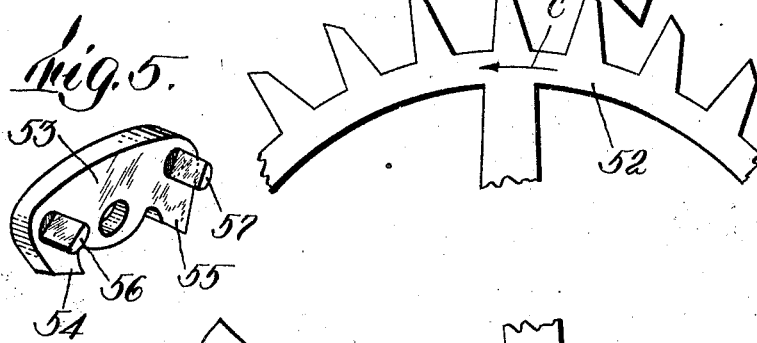
Figure 5 is a perspective view of the pallet which forms the let-off device or element of the mechanism shown in the preceding figures.
Figure 4:
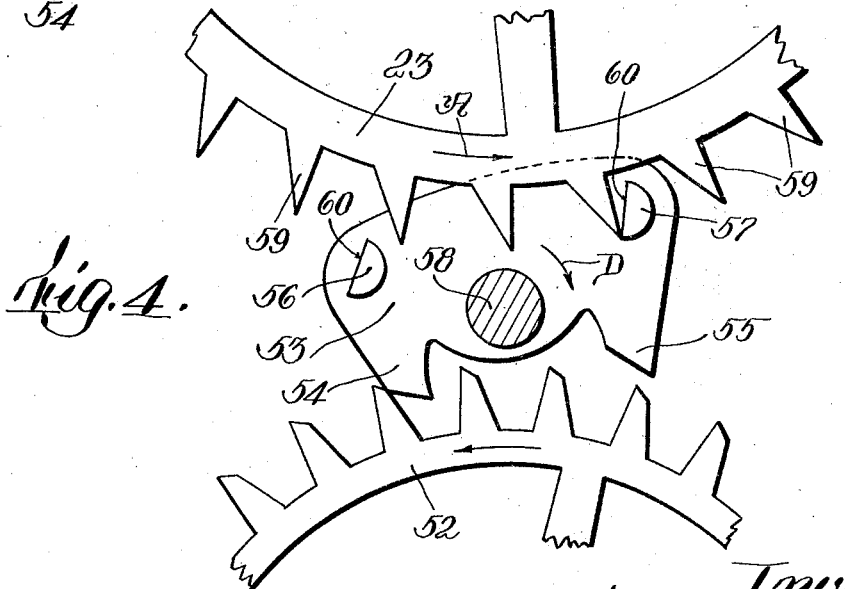
Figure 4 is a similar view of the same mechanism shown in a different position.
Figure 9:
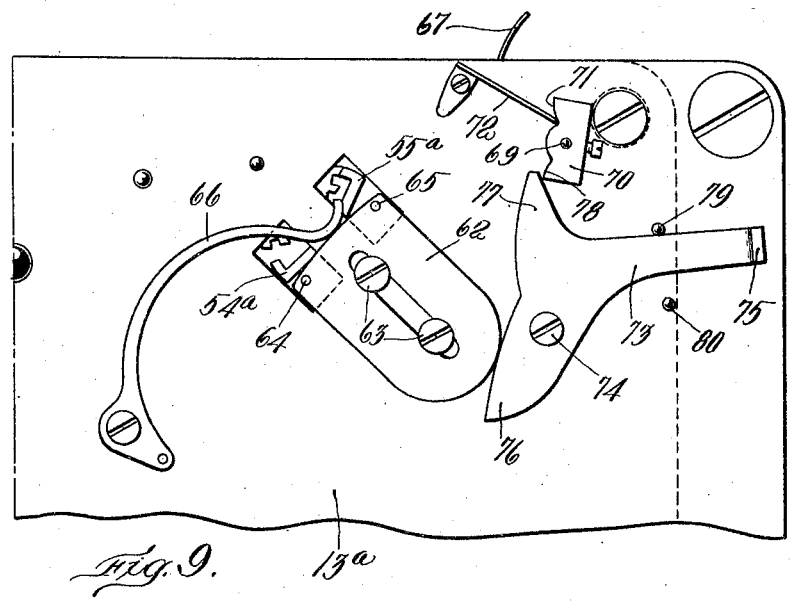
Figure 9 is an elevation showing the complete stopping device.

The teeth 59 of the wheel 23 are so formed as to engage the pins 56 and 57 only at one side and to leave spaces between them wide enough for the pins to enter without making any other contact. As here shown those faces of the teeth which bear on the pins are radial and straight, but this is a detail which may be departed from, provided the essential characteristics of function and operation are retained. Each of the pins 56 and 57 has a face 60 adapted to engage with the teeth 59, and so inclined to the direction in which force is exerted by the teeth, that such force tends to swing the pallet about its axis of oscillation. Thus, referring to Figure 3, it will be seen that one of the teeth 59 is pressed against the face of the pin 56 and that such face makes a distinct angle with the line of pressure application exerted by the tooth. This angle is greater than the critical angle of friction, wherefore the pressure application of the wheel tends to swing the pallet in that direction (indicated by the arrow B) which moves the pin 56 out of the path of the tooth which presses against it and brings the pin 57 into the path of the tooth nearest to the latter. Likewise the face of the pin 57 is inclined to the direction of pressure application upon it by the engaging tooth, as shown in Figure 4, at a greater angle than the critical angle of friction, whereby such pressure tends to swing the pallet in the opposite direction (indicated by the arrow D).

Swinging movement of the pallet in both directions is obstructed by the teeth of the wheel 52, against the ends of which teeth the arms 54 and 55 of the pallet come to bear alternately. Such teeth and pallet arms are formed with complemental contracting faces. These faces are inclined to the direction in which the pallet presses on the teeth at an angle substantially equal to the critical angle of friction between the pallet and wheel. Thus the effect of pressure by the pallet on the wheel is practically to neutralize the frictional drag which resists rotation of the wheel. That is, the inclinations of the faces in question are great enough so that the effect of friction, due to the pallet pressing on the wheel, is substantially overcome but at the same time is not great enough to cause any substantial forward driving or accelerating effect upon the wheel. The exact value which may be given the angle of the faces may vary with the materials of which the wheel and pallets are made, and whether the pallet arms are furnished with jewels or are made of metal. The particular values illustrated in these drawings are for a wheel made of brass and a pallet made of steel.

Similar variations may be made in the inclination of the active faces 60 of the pins 56 and 57, according to the materials of which these pins and the wheel 23 are made, and also according to the value of the component of pressure which is found necessary in any particular case to swing the pallet and avoid liability of its sticking fast. In this embodiment the wheel 23 is also of brass and the pins 56 and 57 are made of steel; but other materials may be used and the pins may be jewels if desired.

The manner of operation of the let-off device thus made and arranged will now be described. In the following description, as well as in the appended claims, the wheels 23 and 52 will be called "escape wheels" simply for convenience of descriptive definition and without limiting intent. Referring to Figure 3 the escape wheel 23, impelled by the power motor in the direction of the arrow A, presses against the pin 56 and tends to swing the pallet in the direction of the arrow B. The latter is obstructed by its arm 54 coming into contact with one of the teeth of the escape wheel 52, and in its turn obstructs the power escape wheel. As the let-off escape wheel 52, driven by the time governed mechanism, progresses in the direction of the arrow C, its obstructing tooth moves away and allows the pallet to swing in the direction indicated, under the impulse applied by the power escape wheel, until it reaches the position shown in Figure 4. Then the pin 56 clears the tooth of the power escape wheel with which it was previously in contact and allows another tooth of that wheel to come to bear against the pin 57, which, in the meantime, has been brought into the path of such tooth. The pallet is then swung in the opposite direction, indicated by the arrow D in Figure 4, until its arm 55 is arrested by a second tooth of the let-off escape wheel, and thereafter it continues to move in the same direction until the pin 57 clears the engaging tooth and the pin 56 is brought into action in the manner first described.

In the mechanism here designed 52 has thirty teeth and is driven at the rate of one revolution per minute. Thus the alternate action of the pins 56 and 57 releases the power escape wheel every second. It is possible, however, by providing the let-off escape wheel with more or less teeth and appropriately designing and arranging the pallet, to release the power escape wheel more or less frequently than this; as, for instance, every half second or so.

Not only are the steps in the movement of the power escape wheel thus caused to take place with great frequency, but the motion of this wheel is substantially or nearly continuous between steps. That is, the motion of the pallet which takes place while either of its pins obstructs the power escape wheel permits movement of the latter wheel even during the period of obstruction, and after either pin releases one tooth there is little lost motion to be taken up before another tooth of the wheel is obstructed by the other pin. Thus there is no appreciable pause between the successive steps of the power mechanism and substantially no jump when either let-off pin releases the wheel. Indeed, the characteristics of the invention permit of specific designs in which, as soon as one tooth of the escape wheel leaves either pin, another tooth of the escape wheel is in position to make contact with the other pin, whereby the motion of the escape wheel may be made perfectly continuous and uniform.

Figure 8:
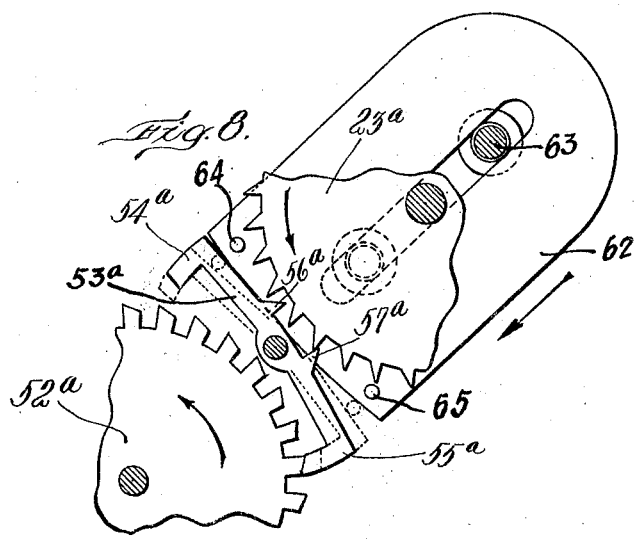
Figure 8 is a fragmentary detail elevation of the let-off mechanism and of part of the stopping device with which the apparatus is provided.

A specifically different construction and arrangement of let-off device is shown in Figures 6, 7 and 8, this different form, however, being exactly the same in principle as that already described and being equivalent thereto. The gear trains with the power motor and with the chronometric regulator of alternative form now being described have the same number and character of elements as the first form, and their various parts are designated by the same reference numbers modified by the exponent "a". in so far as they are shown in Figures 6, 7 and 8.

In the second form the let-off device or double pallet 53$^a$, the let-off escape wheel 52$^a$, and the power escape wheel 23$^a$ are all in the same plane and are located close to the outer plate 13$^a$ of the frame. The pallet has two angular arms 54$^a$ and 55$^a$ with inclined end faces which coact with complemental inclined end faces of the teeth on the let-off escape wheel 52$^a$; and the inclination of these faces to the direction of pressure application from the pallet to the escape wheel is approximately equal to the critical angle of friction between the pallet and wheel for the purpose of overcoming frictional drag on the part of the pallet, without applying any substantial forward impelling force to the wheel, as previously described. On the opposite side of the pallet from that to which the ends of the arms having these faces project, are shoulders 56$^a$ and 57$^a$, which are arranged to coact with the teeth of the power escape wheel 23$^a$ in the same manner that the pins 56 and 57 of the form first described coact with the power wheel 23. The face of shoulder 56ª which obstructs and receives the pressure of the wheel 23ª is so inclined that the pressure on it of such teeth swings the arm 54ª toward the let-off wheel and presses said arm against the end of the tooth on the latter wheel on which it then comes to bear; while the face of shoulder 57ª is also arranged to obstruct the teeth of the power wheel 23ª and its face which receives the pressure of such teeth is inclined so as to swing the pallet in the opposite direction and to press the arm 55ª toward the let-off wheel.

By means of the shoulders 56ª and 57ª being alternatively engaged with the teeth of the power wheel 23ª, the left-off pallet is oscillated, and by reason of the arms 54ª and 55ª being alternately arrested by the let-off escape wheel, the power escape wheel is checked at each swing of the pallet. As each tooth of the let-off wheel passes away from the arm of the pallet which previously engaged it, the power escape wheel is released; and the number of such releases taking place during each rotation of this wheel is twice the number of teeth of the wheel.

In substance the function and effect of the double pallet 53ª are identical with those of the pallet 53. Structurally the difference between the two forms of pallet is that the arms and shoulders of the pallet 53ª are all in the same plane, while the corresponding abutments of the pallet 53 are in different planes; and this difference permits the pallet 53ª to be made of a single piece of steel or other suitable material, and avoids the necessity of inserting pins or the like in the pallet.

The placement of the escape wheels and pallet next to one of the plates of the movement frame enables me to apply a simple and effective device for stopping both gear trains, which device acts without injury to any parts of the mechanism. This device comprises a stop for the double pallet, a stop for the balance wheel of the chronometric regulator, and a common controlling lever.

The pallet stop is a slotted slide 62 mounted on the outer face of the frame plate 13ª, being held in place and guided by screws 63 which pass through its slot into the plate. The slide carries two pins 64 and 65 which pass through openings in the plate and are adapted to bear on the arms of the pallet at the side opposite to the let-off escape wheel. A curved spring 66 is fastened to the outside of the plate and bears on the end of the slide 62, holding it away from the pallet and leaving the latter free to function.

The stop for the time movement is a curved spring 67 in the same plane with the balance wheel 50ª and fastened to a head 68 on a shaft 69 which passes through the plates 13ª and 28ª. This spring has a volute form so that when the shaft is turned in one direction it is brought gently against the balance wheel but with sufficient force to stop the latter. A block 70 is secured to the shaft 69 at the outer side of plate 13ª and is formed with a shoulder 71 against which one end of a spring 72 bears, the other end of such spring being fastened to the plate.

The controlling lever 73 is pivoted to the plate 13ª by a screw 74 and has a turned-up end 75 forming a handle. It also has two arms 76 and 77, one of which bears on the outer end of the slide 62 and the other on a shoulder 78 of the block 70. The operating arm of this lever is flanked by two stop pins 79 and 80 which limit its movement. The spring 66 acting through the slide 62 holds the controlling lever in the position shown. When the operating arm of this lever is moved down against the stop 80, the slide is moved forward until both pins bear on the pallet, holding the latter in mid position, and the arm 77 swings the volute spring 67 into contact with the balance wheel of the time train. Then both trains are stopped because when the pallet is in mid position one or the other of its shoulders is in the way of a tooth of the power escape wheel.

For the purpose of concisely defining the double pallet, both as to the two forms hereinbefore described and as to other possible equivalents thereof, the arms 54, 55 and likewise 54ª and 55ª may be considered as abutments, or a set of abutments, which coact with the let-off escape wheel and are alternately arrested and released thereby in turn, and the pins 56, 57, as also the shoulders 56ª and 57ª, may be considered as a second set of abutments which cooperate alternately with different teeth of the power escape wheel to obstruct and release the latter, and also to be thrust alternately away from the power wheel by the pressure exerted by the teeth of such wheel.

Thus I have accomplished the objects previously set forth of regulating accurately the rate of running, and permitting such running to take place smoothly and continuously, of a power motor having a driving spring capable of delivering any amount of power which may be required for the purpose to which the motor is applied. I would say, however, that the protection which I seek is not limited to a combination in which the power motor is driven by a spring and no other source of power, for the principles and essentials characteristics of the invention are applicable to situations in which the driving power is derived from any source.

What I claim and desire to secure by Letters Patent is:

1. A time-controlled power motor comprising a power driven mechanism, a separate time governed mechanism, and an intermediate let-off device constructed and arranged to obstruct and release alternately said power driven mechanism, said time governed mechanism having an element constructed and arranged to obstruct and release alternately said let-off device.

2. A time-controlled power motor comprising a power driven mechanism, a separate time governed mechanism, and an intermediate let-off device constructed and arranged to obstruct and release alternately said power driven mechanism, said time governed mechanism having a rotating toothed element constructed and arranged to obstruct by means of its teeth, and release alternately, said let-off device, said element being driven at a rate of rotation and having a number of teeth sufficient to cause alternate arrest and release of the let-off device at time intervals of the order of magnitude of one second.

3. A time-controlled power motor comprising a power driven mechanism, a separate time governed mechanism, and an intermediate let-off device constructed and arranged to obstruct and release alternately said power driven mechanism, said time governed mechanism having an element constructed and arranged to obstruct and release alternately said let-off device, said element and the let-off device being complementally constructed to permit gradual movement of the latter between the successive releases of the power driven mechanism.

4. A time-controlled motor consisting of a power driven mechanism, having a toothed escape wheel, a let-off device having abutments arranged to be engaged alternately and impelled by teeth of said wheel, at the same time arresting and releasing said wheel, and a time governed controller for said let-off device having obstructing portions adapted to arrest the movement of said let-off device and constructed to permit a controlled motion of the let-off device while obstructing the latter.

5. A time-controlled motor comprising a power driven mechanism having an escape wheel, a time governed mechanism having a let-off escape wheel and a let-off device having members arranged to engage alternately different teeth of the power escape wheel, to be moved respectively in opposite directions thereby, and further having abutting portions adapted to be alternately arrested and released by the let-off escape wheel.

6. A time-governed motor comprising a power driven escape wheel having a series of teeth, a time-controlled let-off escape wheel also having a series of teeth, and a let-off device having two sets of abutments, those of one set being adapted to engage alternately different teeth of the power escape wheel and those of the second set to engage alternately different teeth of the let-off escape wheel.

7. A time governed motor comprising a power driven escape wheel having a series of teeth, a time-controlled let-off escape wheel also having a series of teeth, and a let-off device having two sets of abutments, those of one set being adapted to engage alternately different teeth of the power escape wheel and those of the second set to engage alternately different teeth of the let-off escape wheel, said let-off device being pivotally mounted and adapted to oscillate, whereby its respective abutments are brought alternately into action with the coacting teeth of the respective escape wheels.

8. A time-controlled motor comprising a power driven mechanism having an escape wheel provided with a series of teeth, an oscillatively mounted pallet having a pair of abutments cooperating with said teeth to obstruct and release the same alternately and being constructed to transform thrust of said teeth into oscillative movement of the pallet, and a separately driven time-governed movement having a let-off escape wheel; said pallet having other abutments cooperating with teeth of said let-off wheel so as alternately to be arrested and released thereby.

9. A time-controlled motor comprising a power driven mechanism having an escape wheel provided with a series of teeth, an oscillatively mounted pallet having a pair of abutments cooperating with said teeth to obstruct and release the same alternately and being constructed to transform thrust of said teeth into oscillative movement of the pallet, and a separately driven time-governed movement having a let-off escape wheel; said pallet having other abutments cooperating with the teeth of said let-off wheel so as alternately to be arrested and released thereby, the last-named abutments and teeth being also constructed and operating to permit continuing motion of the pallet while being so obstructed.

10. A time-controlled motor comprising a power driven mechanism, a let-off device obstructing movement of said mechanism and being constructed to be displaced by pressure exerted through said mechanism, and a time-governed mechanism having an escape member constructed and arranged to arrest alternately different parts of said let-off device, said escape member and let-off device having complemental abutting surfaces which are inclined at an angle, substantially equal to the critical angle of friction, to the direction of force application by the let-off device, whereby the pressure exerted by the latter on said member is without appreciably retarding or accelerating effect on the time governed mechanism.

11. In a time-governed motor, the combination of a power driven escape wheel having teeth, of a separately driven time-governed let-off escape wheel having teeth, and a pallet intermediate said wheels having sets of abutments cooperating, respectively, with the teeth of the different wheels, the abutments cooperating with the power driven wheel having surfaces formed to cause motion of the pallet under the pressure applied by the wheel and the abutments cooperating with the let-off escape wheel being constructed to overcome the retarding effect on the let-off wheel of friction between the contacting forces of the teeth of said wheel and the last mentioned abutments without applying a sensible impelling force to the let-off wheel.

12. In a time-controlled motor, a power driven escape wheel having teeth, a time-controlled escape wheel having teeth, and an oscillative pallet having arms arranged to bear alternately on the ends of the teeth of the latter wheel, said pallet having abutments in position to engage and obstruct alternately the teeth of the first-named wheel.

13. In a time-controlled motor, a power driven escape wheel having teeth, a time-controlled escape wheel having teeth, and an oscillative pallet, having arms arranged to bear alternately on the ends of the teeth of the latter wheel, said pallet having abutments in position to engage and obstruct alternately the teeth of the first-named wheel, said abutments having faces arranged to receive, and being inclined to, the thrust applied by the teeth of the last-named wheel, whereby the pallet is moved alternately in opposite directions by the wheel.

14. In a time-controlled motor, a power driven escape wheel having teeth, a time-controlled escape wheel having teeth, and an oscillative pallet having arms arranged to bear alternately on the ends of the teeth of said time-controlled wheel, said pallet having abutments in position to engage and obstruct alternately the teeth of said power-driven wheel, said abutments having faces arranged to receive, and being inclined to, the thrust applied by the teeth of the power-driven wheel, the arms of the pallet having inclined faces which bear on complemental faces at the ends of the teeth of the time-controlled wheel, said inclined faces being at substantially the critical angle of friction between the pallet and wheel.

15. A pallet having two sets of abutments adapted to cooperate respectively with the teeth of two complemental escape wheels.

16. A pallet adapted to be mounted in an oscillating manner and having two abutments adapted to arrest, and be moved by, the teeth of an escape wheel, and having other abutments adapted to be arrested by the teeth of another escape wheel.

17. A pallet adapted to be mounted in an oscillative manner and having two abutments adapted to arrest and be moved by the teeth of an escape wheel, said abutments having pressure-receiving faces making an angle with the directions in which they respectively are intended to move which is greater than the critical angle of friction between the abutments and the cooperating wheel; and the pallet having also two other abutments adapted to be arrested by the teeth of another escape wheel and having faces for contact with said wheel which are inclined to the paths in which the latter abutments are intended to move and at an angle substantially equal to the critical angle of friction between such abutments and the last-named escape wheel.

18. A double pallet for the purpose set forth having arms at opposite sides of a line through its center, which arms have faces adapted to coact with an escape wheel; and pins projecting from one side of the pallet and located on opposite sides of a line passing through the said center and provided with faces adapted to cooperate with another escape wheel.

In testimony whereof I have affixed my signature.

FREDERICK W. BOLD.